Feb. 9, 1971    W. H. COWLES    3,561,211
CONTROL WITH CONSTANT DROOP GOVERNOR
Filed Sept. 6, 1968    2 Sheets-Sheet 1

WARREN H. COWLES
INVENTOR.

BY Walter Potoroka, Jr.
ATTORNEY

GOVERNOR CURVES

United States Patent Office 3,561,211
Patented Feb. 9, 1971

3,561,211
CONTROL WITH CONSTANT DROOP GOVERNOR
Warren H. Cowles, Birmingham, Mich., assignor to Holley Carburetor Company, Warren, Mich., a corporation of Michigan
Continuation-in-part of application Ser. No. 561,266, June 28, 1966. This application Sept. 6, 1968, Ser. No. 757,824
Int. Cl. F02c 9/08
U.S. Cl. 60—39.28                                 4 Claims

ABSTRACT OF THE DISCLOSURE

A gas turbine engine fuel control having a governor system providing a constant governor droop at all engine speeds, the governor including an engine speed sensing mechanism, an acceleration cam and a speed cam, mechanism for positioning the acceleration and speed cams in response to speed changes indicated by the speed sensing mechanism, lever means operatively connected between the acceleration cam and the main fuel valve of the fuel control for regulating the fuel valve during acceleration of the engine, lever means operatively connected between the speed cam and the fuel valve for regulating the fuel valve during the governing of the engine, a manually adjusted governor cam, and an adjustable platform member between the manually adjusted governor cam linkage and the speed cam lever means.

BRIEF SUMMARY OF THE INVENTION

This is a continuation-in-part of U.S. application Ser. No. 561,266, now abandoned, entitled Fuel Control and filed on June 28, 1966 in the name of Warren H. Cowles. While FIG. 1 of this application is not identical to FIG. 1 of the above-referenced parent application, the structure of FIG. 1 merely comprises a simplified illustration of the structure that was shown in FIG. 1 of the parent application and/or incorporated therein by reference to Fleming et al. U.S. Pat. No. 3,068,648. Certain portoins of FIG. 1 of the parent application have been deleted as they form no part of the present invention.

This invention relates generally to gas turbine engine fuel controls, and more particularly to an improved governor system therefor.

Most prior art governor systems are generally characterized by a fuel flow vs. speed curve wherein the usual governor "hooks" or droops differed at the low and high ends of the speed range. This generally undesirable characteristic was partially eliminated by the governor system included in the fuel control shown by the Fleming patent wherein there was employed a governor piston assembly which included multiple springs of different rates for establishing a load on the governor piston. This improvement caused the slope of the so-called governor hook at idle to become steeper than was previously the case, without changing the slope at the higher speed ranges; however, in the middle speed range, when the lower rate spring bottomed out and the higher rate spring became the effective force, engine speed varied considerably with fuel flow changes, and the resultant governor hooks were again comparable to those of the prior systems.

Admittedly, in some prior governor systems, the governor droops are constant, or parallel to each other, when compared on fuel flow vs. "speed squared" graphs, as opposed to fuel flow vs. speed graphs; however, such systems are quite complex.

Accordingly, a primary object of the invention is to provide a relatively simple governor system which produces a constant governor droop at all engine speeds, the result being a constant engine speed change for a particular fuel flow change at any engine speed.

Another object of the invention is to provide such a system which includes provisions for adjusting the slopes of all governor hooks a constant amount, and additional provisions for adjusting the slope of any particular governor hook.

Another object of the invention is to provide externally accessible means for making such adjustments without disassembling the fuel control or the governor portion thereof.

A further object of the invention is to provide such a system which may be used to replace the governor system in the fuel control mechanism described in the above-mentioned Fleming patent.

A more specific object of the invention is to provide a novel speed cam in addition to the usual acceleration cam, along with an associated novel adder bar and lever arrangement.

DETAILED DESCRIPTION

Construction

Figure 1:
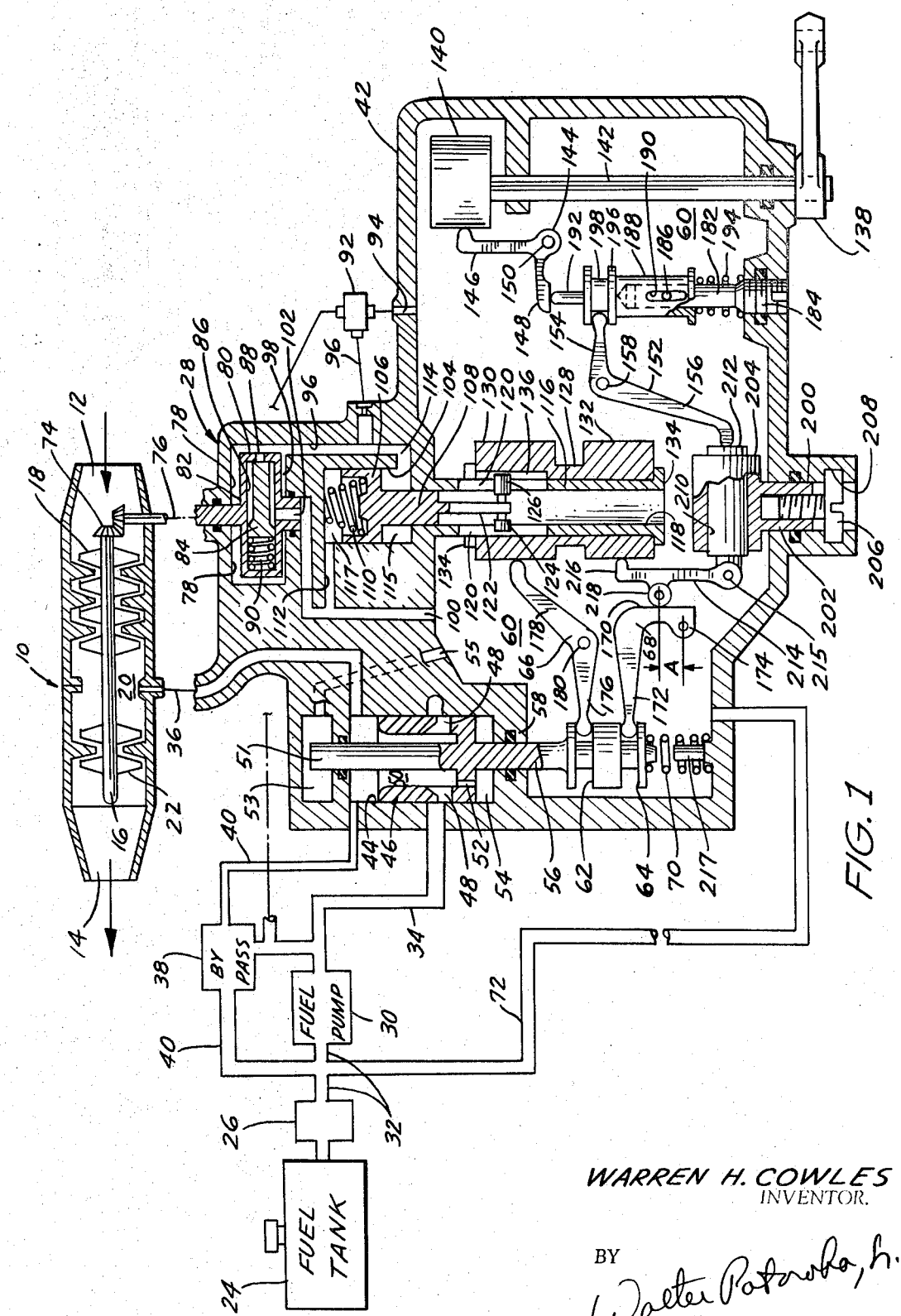
FIG. 1 is a schematic cross-sectional view illustrating a gas turbine engine and that portion of a fuel system therefor embodying the invention.

Referring to the drawings in greater detail, particularly FIG. 1, a typical gas turbine engine 10 may be of any specific construction including a housing having an air inlet 12, an exhaust outlet 14, a shaft 16, a compressor 18, a burner chamber 20 and a turbine 22.

The fuel system includes a fuel tank 24, a booster pump 26 and a fuel control 28, which may include the main fuel pump 30 and be of any suitable construction, such as the fuel control shown in the referenced Fleming patent or any other generally similar fuel control, it being understood that FIG. 1 includes only that portion of a complete control necessary to illustrate the invention.

It is well known, for example, that gas turbine engine fuel controls are constructed to operate in response to various parameters, such as various engine temperatures, pressures, speeds and the pilot's power selector lever. In FIG. 1, there is illustrated only that portion of a fuel control that includes parameters of engine speed and the power selector lever. Thus, it will be understood that a complete control would, in most instances, include one or more of the above mentioned other parameters.

Referring again to FIG. 1, the booster pump 26 which is normally driven by electrical means, pumps fuel from the tank 24 to the main fuel pump 30 which supplies fuel to the control 28. Tank 24 is connected to the pumps 26 and 30 by a conduit 32 so that unmetered fuel is supplied to the control 28 through a conduit 34 and metered fuel is supplied to the engine burner chamber 20 through the conduit 36. As is common in gas turbine engine fuel controls, excess metered fuel is returned to the inlet of the main fuel pump 30 through the bypass valve system 38 connected in conduit 40.

The fuel control housing 42 is formed to provide a cylinder 44 in which the hollow cylindrical main fuel valve 46 is contained and variably positioned axially so that variable amounts of fuel in conduit 34 under a constant pressure differential determined by bypass system 38 is caused to pass through the metering ports 48, through the central fuel valve cavity 50 and through the conduit 36 to the engine burner chamber 20, all in a manner well known in the art. While the fuel valve 46 shown is limited to translational or axial movement, it will be understood that the invention may be employed in a fuel control in which the fuel valve 46 is formed with so-called multiplying fuel ports and is also caused to rotate in response to any desired parameter, as is shown in the referenced Fleming patent.

Valve 46 is hydraulically balanced by the rod 51 having the same diameter as stem 56 and being subjected, like stem 56, to main cavity pressure supplied through conduit 55 to chamber 53.

In any event, the quantity of fuel supplied to the engine will be determined in the structure shown in FIG. 1 by the axial position of the fuel valve 46 in its cylinder 44, the passage 52 in the valve providing relief for pressure in the chamber 54 below the valve. The stem 56 passes through a wall 58 of the housing 42 and is formed at the end thereof extending into the main body cavity 60 with spaced annular gooves 62 and 64 for receiving levers 66 and 68, respectively, adapted to influence the axial position of the valve 46 in a manner to be described, the spring 70 providing a force urging the valve 46 in one direction.

It will be understood that the main control cavity 60 contains fuel at pump 30 inlet pressure supplied through conduit 72. The engine speed parameter is introduced to the fuel control 28 by any suitable means such as the bevel gear connection 74 with the engine shaft 16 so as to provide a drive shaft 76 rotating at a speed related to engine speed.

The control housing 42 is formed with a cylindrical chamber 78 containing what is commonly referred to as a hydraulic speed sense slinger mechanism 80, the hollow body 82 of which is rotated by the drive 76 and which contains a cylindrical weighted valve 84 operative to move outwardly within the cylinder 86 in response to increasing cylindrical force so as to progressively close the port 88. The valve 84 is urged in the port closing direction by a spring 90, the purpose of the spring being to provide a force for preventing the pressure at port 88 from moving valve 84 to the wide open port position at low engine speeds.

It was stated that the main control cavity 60 contains fuel at pump 30 inlet pressure supplied through the conduit 72. Higher pump 30 outlet pressure is supplied to the pressure regulator 92 which, using control cavity pressure communicated thereto through the conduit 94 as a reference, supplies a regulated pressure through conduit 96 to the cylindrical chamber 98 surrounding the speed sense slinger mechanism 80. The lower main cavity pressure is supplied through the passage 100 to the so-called eye 102 of the slinger mechanism so that this lower cavity pressure exists within the cylinder 86 when the port 88 is closed.

It is thus seen that there is a pressure differential across the valve element 84 controlling the port 88 and that this pressure differential will vary as a square of the speed at which the slinger mechanism 80 is rotated; that is, the higher the speed, the greater the pressure differential, since the valve 84 moves outwardly with increasing centrifugal force.

The control body 42 is formed with another cylindrical chamber 104 in which the two-diameter piston 106 having a stem 108 is movably positioned, the piston 106 being urged in one direction by the spring 110. A variable speed-generated pressure differential is developed across orifice 80 of the slinger mechanism 80, the lower pressure being communicated through the passage 112 to the spring 110 side of the piston 106 and the higher pressure being communicated to the chamber 115 on the other smaller effective diameter side of the piston through passage 96 and port 114. As will be described, the piston 106 is thus positioned axially in accordance with engine speed, spring 110 being a non-linear spring.

The fuel control body 42 is further formed with a cylinder 116 extending into the cavity 60 and having the passage 118 therethrough aligned with the stem 108 so that the stem may move axially through the cylinder. Vertical slots 120 are formed in the cylinder wall and the stem 108 is formed with an extension 122 terminating in a cross member having followers 124 and 126 engaged in the slots. A member 128 having an upper acceleration cam 130 and a lower speed cam 132 is positioned on the cylinder 116, between the retaining flanges 134, in a manner so that the acceleration and speed cams are free to rotate on the cylinder. The member 128 is formed with a suitable spiral slot 136, and the follower member 126 is dimensioned so that it is engaged in both the vertical slot 120 in the cylinder and the spiral slot 136 in the cam member 128, whereby axial movement of the piston 106 causes rotation of the acceleration and speed cams 130 and 132.

It will be understood that the acceleration and speed cams 130 and 132 are contoured to provide the required lift and that they may be formed as three-dimensional cams and provided with axial freedom of movement as taught in the above-referenced Fleming patent. For purposes of simplification in illustrating the invention, however, they are shown as having only rotational freedom of movement.

Referring now the right-hand portion of FIG. 1, it will be seen that rotation of the pilot's throttle or power selector lever 138 causes rotation of the suitably contoured governor cam 140 at the other end of the shaft 142.

The operational connection between the pilot's throttle lever 138 and the automatically-operated fuel control valve 46 will now be described. Lever 144 having arms 146 and 148 is pivoted at 150 on the control housing 42; lever 152 having arms 154 and 156 is pivoted at 158 on the control housing; lever 68 having arms 170 and 172 is pivoted at 174 on the control housing; and lever 66 having arms 176 and 178 is pivoted at 180 on the control housing.

A stem 182, adjustable axially by means of its threaded portion 184 and having a pin 186 thereon, extends into the control housing cavity 60 below arm 148 of lever 144. A hollow cylindrical member 188 is mounted for axial movement on the stem 182, with the pin 186 positioned in a slot 190 formed in the member 188. A pin 192 extends from the member 188 to engage arm 148 of the lever 144, and a spring 194 urges the member 188 upwardly so that arm 146 of the lever 144 is continuously in engagement with the governor cam 140. The member 188 is formed with spaced annular flanges 196 formed on annular groove 198 in which arm 154 of lever 152 is positioned so that movement of the member 188 causes rotation of lever 152 about its pivot 158.

The control housing 42 is further formed with a passage 200 in which a cylindrical internally-threaded projection 202 formed in what may be termed a platform member 204 is adjustably retained by means of the screw 206, which in this construction is shown as being locked in a groove 208 so that a rotation of the screw adjusts the platform member 204 vertically in either direction in FIG. 1. The platform member 204 is formed with a crossed passage 210 in which a cylindrical member 212 is mounted with axial freedom of movement thereof. Arm 156 of lever 152 is continuously in engagement with one end of the member 204, and the other end of the member 204 has pivotally connected thereto an adder bar member 214 having the opposite end 216 thereof in engagement with the speed cam 132 and the intermediate roller 218 attached thereto in engagement with arm 170 of the lever 172.

OPERATION

Figure 3:
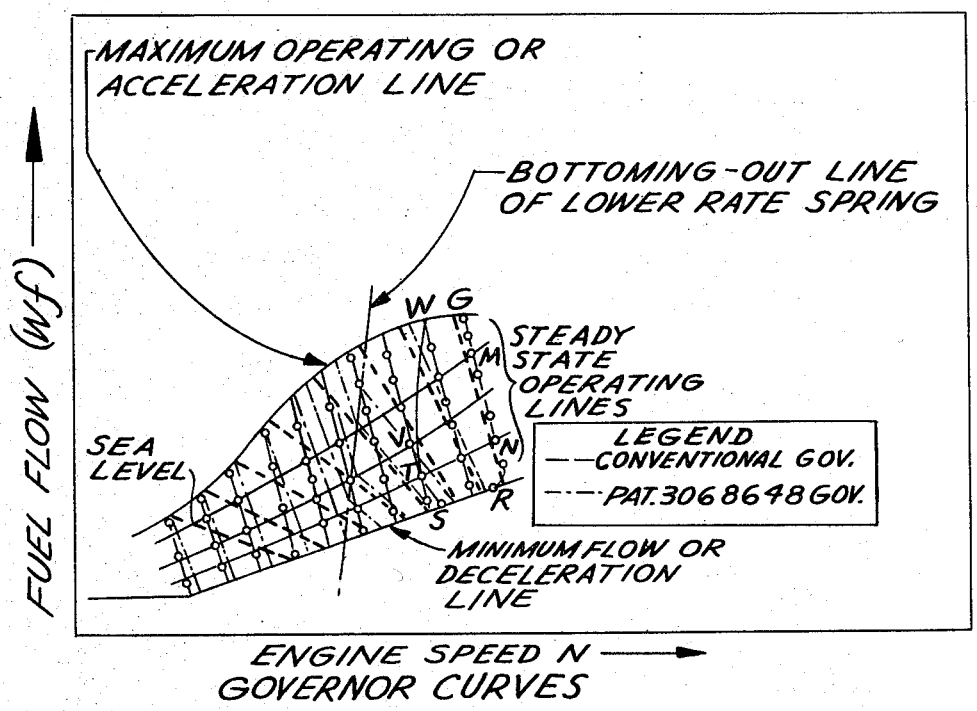
FIG. 3 is a fuel flow vs. engine speed graph comparing performance curves of prior art systems and a system constructed according to the invention.

For purposes of illustration, let it be assumed that the gas turbine engine 10 is an aircraft engine and that it is desired to accelerate the same, prior to take-off, along the maximum operating or acceleration curve of FIG. 3, toward some equilibrium or steady state point M on the sea level curve. To initiate this transient or non-equilibrium condition, the pilot will have rotated the manual selector or throttle lever 138 toward a higher speed setting. This will rotate the governor cam 140 which, in turn, will cause the lever 144 to rotate in a clockwise direction about the pivot point 150, the arm 146 being held in contact with the cam 140 by the spring 194 through member 188. The other arm 148 of the lever 144 will also have been rotated in a clockwise direction, allowing the linkage member 188 to move upwardly in FIG. 1, and thereby rotating the lever 152 in a counterclockwise direction about its pivot point 158.

When this occurs, arm 156 of lever 152 moves away from member 212. Since spring 70 constantly urges the stem 56 of valve 46 upwardly, upward movement of the valve 46 is possible at this time because lever 68 will at the same time be rotated clockwise and cause the adder bar 214 to rotate in a counterclockwise direction about a fulcrum at the point of engagement of the end 216 of the adder bar with the speed cam. This results in movement of member 212 to the right to the extent permitted by the position of arm 156 of lever 152. Upward movement of main fuel valve 46 increases fuel flow through the ports 48 and to the engine through conduit 36.

Increased fuel flow to the engine will cause the engine to increase in speed, resulting in the slinger mechanism 80 being rotated faster through its drive 76 connected to the engine. The regulated constant pressure in conduit 96 is a relatively high pressure and flow is through the conduit 96, the port 88 and the conduits 102 and 100 to the lower pressure main cavity 60. It has been stated that the valve 84 of slinger mechanism 80 controls flow through the port 88, the higher the engine speed resulting in less flow through port 88 and a higher pressure in conduit 96, port 114 and chamber 115 under the piston 106. That is, increased rotational speed of slinger mechanism 80 moves the valve 84 outwardly with respect to the axis of rotation and increases the pressure in chamber 115, the pressure differential across orifice 88 being proportional to and indicative of engine speed.

The pressure differential across orifice 88 varies as the square of engine speed and the higher pressure in chamber 115 causes upward movement of the piston 106 against the force of the spring 110. However, spring 110 is a non-linear spring such that resultant axial movement of piston 106 under the influence of the variable speed-generated pressure differential across orifice 88 is linear with respect to speed. This linear upward movement of piston 106 causes the extension 122 thereof and the follower members 124 and 126 to move upwardly through the vertical slots 120 formed in fixed cylinder 116. Since the slot 136 in the cam member 128 is formed as a helix and it receives the follower 126, the cam member 128, on which the acceleration cam 130 and the speed cam 132 are formed, is caused to rotate, in the manner of a Yankee Screwdriver mechanism.

Acceleration cam 130 is contoured such that the above-mentioned upward movement of the fuel valve 46, and the resulting increased fuel flow, continue until the point G is reached along the acceleration curve of FIG. 3, at the top of governor hook GM. That is, the fuel valve 46 can move upwardly until the arm 178 of lever 66, which is caused to rotate clockwise about its pivot 180, engages the acceleration cam 130 which was repositioned as a result of the increased speed of the slinger mechanism 80 and the resulting new position of piston 106.

At this point, the contour of the speed cam 132, which necessarily rotates with the acceleration cam 130, is such that it lifts the follower end 216 of the adder bar 214, pivoting the adder bar in a counterclockwise direction in FIG. 1 about the pivot point 215 at the pivotal connection between the adder bar 214 and the member 212. It will be remembered that the pivot point 215 is a fixed point, but that its position changes with the position of the member 212.

Since the roller 218 of adder bar 214 is in engagement with arm 170 of lever 68, such counterclockwise rotation of the adder bar rotates lever 68 counterclockwise about its pivot 174 to force the main fuel valve 46 downwardly in FIG. 1. Such downward movement of fuel valve 46 will, of course, cause a decreasing flow of fuel to the engine through ports 48 and conduit 36 until point M is reached on the sea level steady state line of the Fuel Flow vs. Engine Speed graph of FIG. 3. The contours of the cams 130 and 132 are coordinated such that while governing action from the point G to the point M (governor hook GM) is taking place, the arm 178 of lever 66 will be out of engagement with the acceleration cam 130, it being noted that the lever 66 is rotated counterclockwise by downward movement of the main fuel valve 46 so that the arm 178 backs away from the acceleration cam 130.

Once the aircraft has taken off and while climbing to some altitude such as that represented by point N in FIG. 3, the speed cam 132 will continue to control the downward movement in FIG. 1 of the main fuel valve 46, causing a reduced fuel flow with a slightly increasing speed, as is apparent from the curve M–N. It may be noted, at this point, that the contour of the speed cam 132 is such that the resultant cam lift is constant with speed, thereby assuring that the governor hooks represented by the dash-circle lines in FIG. 3 will always be parallel at all speeds.

In contrast to this prior art governor systems, which normally utilized a mechanical speed sense force involving a squared curve due to centrifugal force and opposing a governor spring to reposition the fuel valve, produced variably sloped governor hooks with speed changes, as represented by the heavy dash lines of FIG. 3 (FIG. 19 in the Fleming patent) and identified in the legend as Conventional Governor. As mentioned above, this condition was improved upon by use of the different rate multiple springs as taught by Fleming Pat. No. 3,068,648, the functional characteristics of which are represented by the light dash-dot lines of FIG. 3 and identified in the legend as Pat. 3,068,648 Gov.

Steady state or equilibrium operation for a given altitude, as represented by point N, would be maintained until such time, for example, as would be desired to decrease speed. Decreasing speed would be accomplished by moving the selector lever 138 to a lower power setting. This would rotate the governor cam 140 so as to rotate the lever 144 in a counterclockwise direction, at the same time causing lever 152 to rotate in a clockwise direction. In a reverse manner, as compared to increasing speed, the member 212 would now be moved to the left by arm 156 of lever 152, causing the roller 218 of the adder bar 214 to pivot the lever 68 in a counterclockwise direction about its pivot 174 and thereby moving the fuel valve 46 downwardly in FIG. 1. The limit of such downward movement of fuel valve 46 in the decreasing fuel direction would occur upon its engagement with the minimum flow stop 217, which corresponds to point R of FIG. 3 for example.

Fuel flow may continue to decrease slightly, with decreasing speed, between points R and S by virtue of a resultant change in some other operating parameter, such as compressor discharge pressure (not a part of this invention but discussed in the Fleming patent), even though there is no further movement of the fuel valve 46. During the time that stop 217 is engaged, movement of the various levers without failure may be permitted by feedback through the system to a spring equivalent to spring 254 shown in FIG. 2, which will merely compress.

Once point S is reached, as determined by the particular position of the selector lever 138, the influence of the speed cam 132 on the adder bar 214 will be such that the fuel valve 46 will, once again, be lifted by the spring 70 causing a change from point S to either T or V, depending upon the altitude and the particular engine characteristic involved.

The contours of the governor cam 140, speed cam 132 and the acceleration cam 130 are coordinated in a manner such that increasing the speed seting of the governor cam while at some particular altitude, such as between point T and N, would involve the governor cam 140 while moving from point T to point W, the acceleration cam 130 from point W to point G, and the speed cam 132 from point G to point N, all in the manner previously described above.

Should it be desirable to change the slope of the parallel governor hooks, this may be accomplished by either reshaping the speed cam 132 or, more simply, by turning the adjusting screw 206, thereby moving the platform member 204, and consequently the member 212, either up or down in FIG. 1 so as to change the effective length of lever arm A. This, of course, changes the effect of the lever 68 on the fuel valve 46 when the lever 68 is acted upon by the speed cam 132 through the adder bar 214.

It is recognized that movement of the member 212 during normal operation and the resultant pivotal movement of the adder bar 214 slightly changes the effective lever arm A, theoretically producing a slightly steeper governor hook at higher speeds. While this is considered to be a negligible error, such error may be eliminated, if desirable or necessary, by providing a three-dimensional speed cam 132 for engagement by the follower end 216 of the adder bar 214. Also, if it became desirable or necessary to change the slope of the governor hook at a particular speed or speeds, this may also be accomplished by appropriately contouring the speed cam 132.

Figure 2:
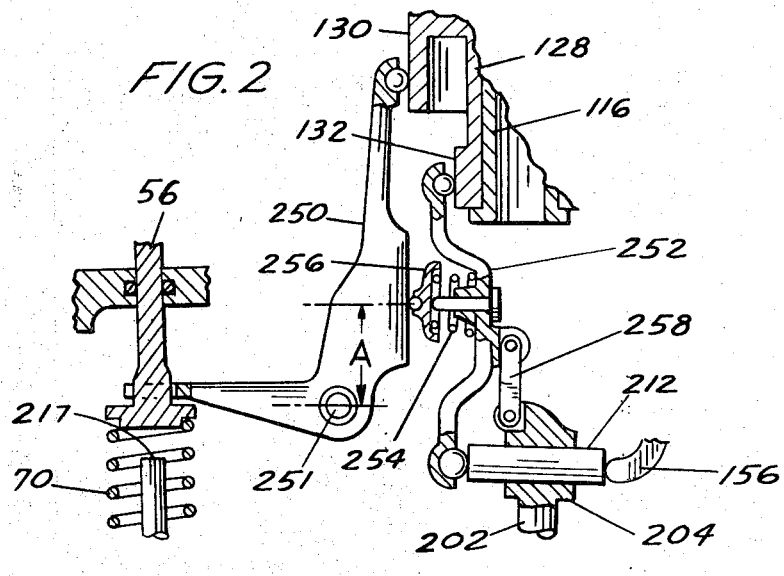
FIG. 2 is a fragmentary schematic cross-sectional view illustrating a modification of the invention.

A possible modification of the invention is illustrated in FIG. 2, wherein FIG. 1 reference numerals are employed to designate elements common to both FIGS. 1 and 2. Reference may be had to the above description of structure and operation of the common elements. The difference between the FIG. 1 structure and the FIG. 2 modification is that the means for operating the main fuel valve 46 is a single lever 250, rather than levers 66 and 68 in combination with the adder bar 214 of FIG. 1.

It will be apparent in FIG. 2 that the lever 250 will be acted upon to position the main fuel valve 46, either by moving the valve stem 56 downwardly against the force of spring 70 by counterclockwise rotation thereof or by rotating clockwise about its pivot 251 and allowing the spring 70 to move the valve stem 56 upwardly, either by the acceleration cam 130 directly or by the speed cam 132 through the floating adder bar 252, depending upon whether acceleration or speed governing is taking place. A detent spring 254 is mounted between the adder bar 252 and the slidably mounted spring retainer 256 engaging the lever 250, the spring 254 serving the same function as the spring 194 of FIG. 1 when the stem 56 of fuel valve 46 is in contact with the minimum flow stop 217. A link 258 is pivotally connected at its ends between the adder bar 252 and the adjustable member 204 so as to anchor the adder bar, eliminate lateral freedom of movement thereof and cause adjustment of the adder bar along with adjustment of the platform member 204 to effect a change in the lever arm A.

In all other respects, a system embodying the FIG. 2 modification would operate in the same manner as the structure of FIG. 1.

It should be apparent that the invention accomplishes the above-stated objects and provides simple and novel fuel control means characterized by a constant governor droop at all engine speeds, with provision for altering any or all governor hooks throughout the entire engine speed range.

What I claim as my invention is:

1. A fuel control for a gas turbine engine, said control comprising a housing having an unmetered fuel inlet, a metered fuel outlet, a fuel passage connecting said inlet and said outlet, a valve in said passage for metering the quantity of fuel to be supplied through said outlet, an engine-driven first member for generating a hydraulic pressure indicative of engine speed, a pressure responsive member subjected to said hydraulic pressure so as to be moved thereby in accordance with engine speed, a second member mounted in said housing for rotation by movement of said pressure responsive member, said second member being restricted against translational movement and having separate acceleration and speed cams formed thereon so that rotation thereof results in simultaneous rotation of both said acceleration cam and said fuel valve such that the position of said valve is influenced by the rotational position of said acceleration cam, a manual power selector lever, a governor cam rotated by said power lever, a platform member slidable in a direction transverse to the direction of movement of said pressure responsive member, means providing adjustability of said platform member in a direction substantially parallel to the direction of movement of said pressure responsive member, a lever system between said governor cam and said platform member, said lever system including a pair of bell-crank levers and adjustable resilient means causing one of said pair of levers to be always in engagement with said governor cam, the other of said pair of levers to be always in engagement with said platform member, a second lever system between said speed cam and said fuel valve, said second lever system including an adder bar having one end thereof in engagement with said speed cam, and a portion thereof in engagement with said platform member, and a second pivotally mounted bell-crank lever engaged by said adder bar, one end of said second lever engaging said fuel valve so that the position of said fuel valve is influenced by the position of said second lever.

2. A fuel control such as that recited in claim 1, wherein said adder bar is pivotally mounted on one end of said platform member.

3. A fuel control such as that recited in claim 1, wherein said pressure responsive member comprises a piston having an axially extending stem, said stem being movable through a fixed member having a slot, said second rotational member being mounted on said fixed member and having a spiral cam slot, said stem having a follower disposed in said cam slot so that translational movement of said stem results in rotation of said second rotational member.

4. A fuel control such as that recited in claim 1, wherein the contours of said speed and acceleration cams are related such that said speed cam influences said fuel valve through said lever system between said governor cam and said fuel valve only during acceleration of said engine, said lever between said acceleration cam and said fuel valve being inoperative to influence said fuel valve except upon acceleration of said engine resulting from movement of said power lever to increased power, the rise of said speed cam being constant with speed so as to provide a constant governor droop at all engine speeds.

References Cited

UNITED STATES PATENTS

| | | | |
|---|---|---|---|
| 3,068,648 | 12/1962 | Fleming et al. | 60—39.28 |
| 3,180,426 | 4/1965 | Crim | 60—29.28UX |
| 3,196,613 | 7/1965 | Porter et al. | 60—39.28 |

AL LAWRENCE SMITH, Primary Examiner